Jan. 21, 1941. T. A. DICKS 2,229,058
CONTROLLABLE PITCH PROPELLER
Filed April 29, 1937 3 Sheets-Sheet 1
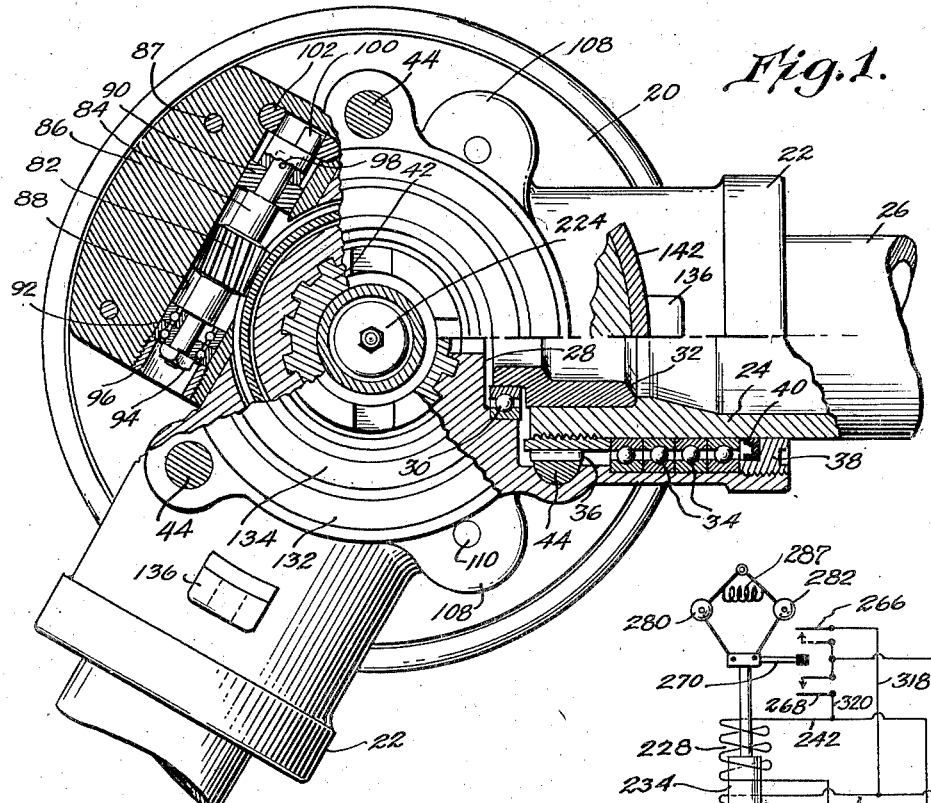
Fig. 1.
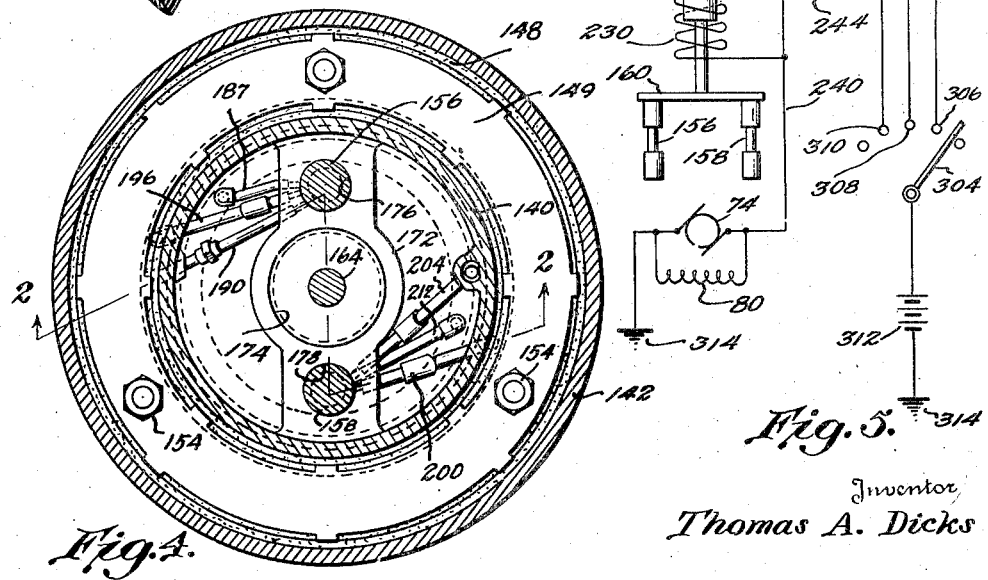
Fig. 4.
Fig. 5.
Inventor
Thomas A. Dicks
By Raymond W. Wootton
Attorney

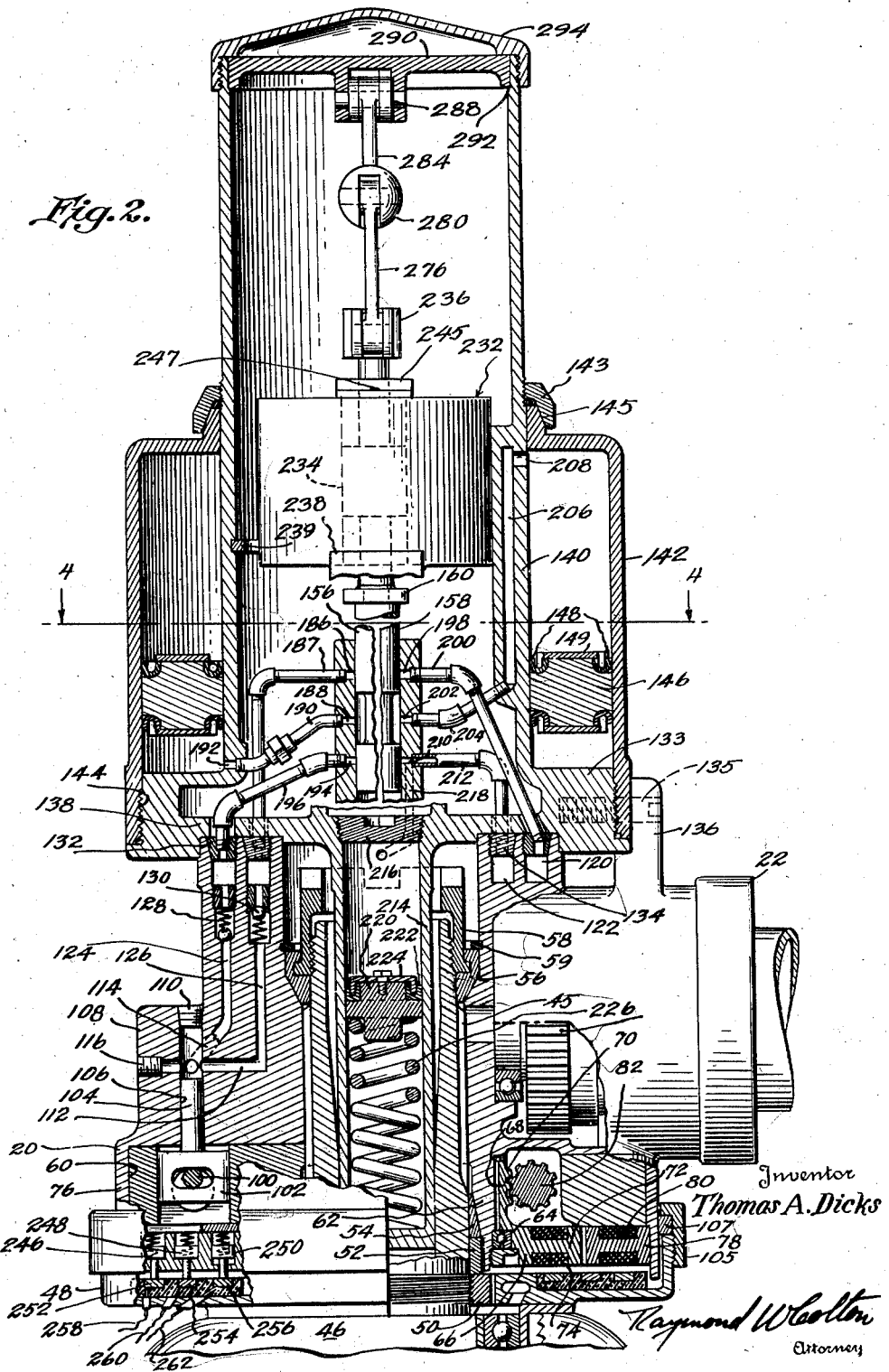

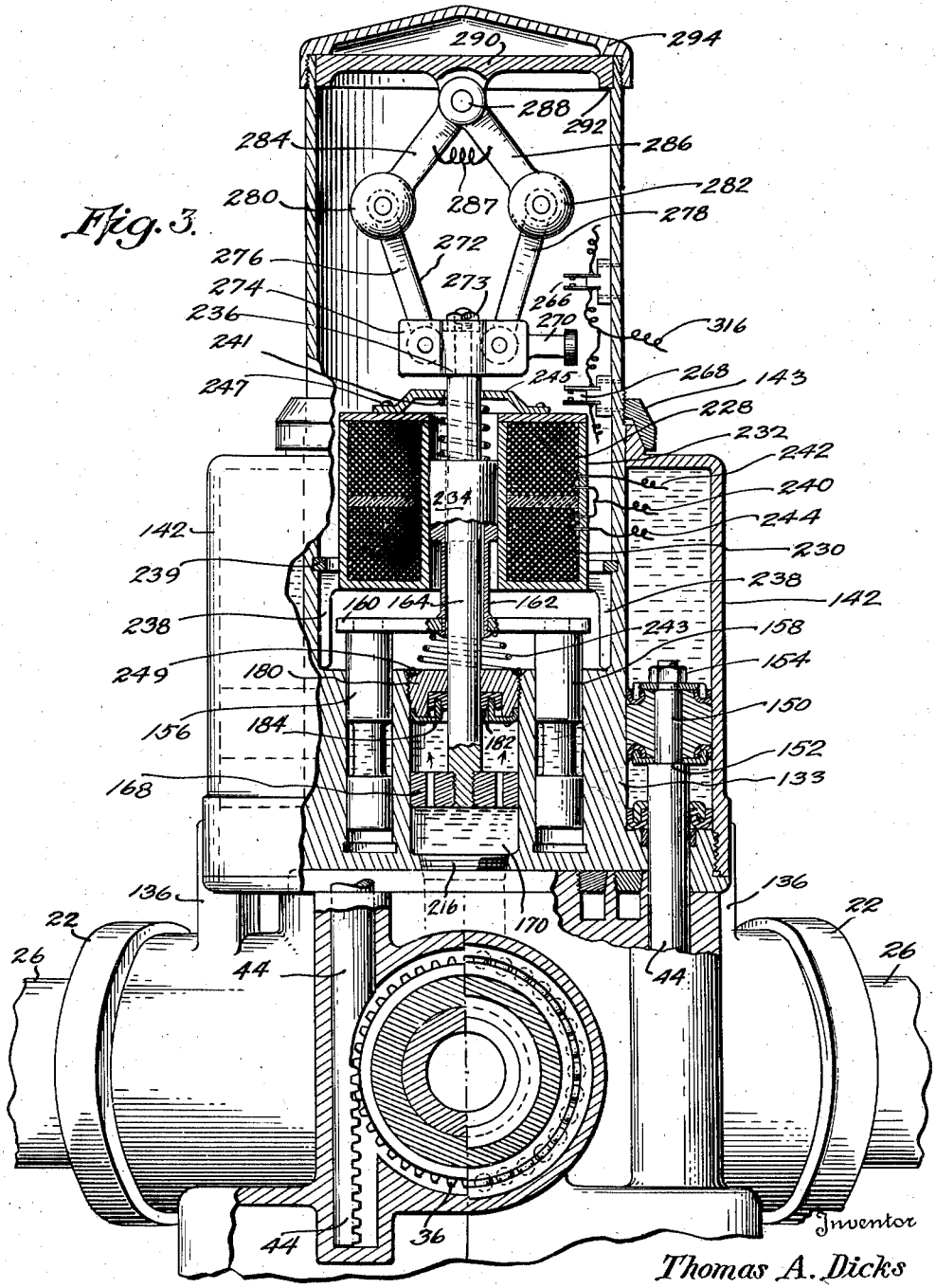

Patented Jan. 21, 1941

2,229,058

UNITED STATES PATENT OFFICE 2,229,058

CONTROLLABLE PITCH PROPELLER

Thomas A. Dicks, Pittsburgh, Pa.

Application April 29, 1937, Serial No. 139,795

12 Claims. (Cl. 170—163)

The present invention relates to controllable pitch propellers, particularly as applied to aeronautics.

Controllable pitch propellers heretofore known in the art, are largely based upon three different principles of operation. These three types depend upon mechanical, electrical and hydraulic actuation respectively, for adjusting the propeller blades to the desired pitch.

The mechanical type necessarily depends upon mechanical linkages from the stationary parts of the ship to the rotating hub. Due to the relatively high speeds encountered and the large forces to be overcome, controlling mechanisms of this type soon become so badly worn that replacement with new equipment becomes necessary. Moreover, the mechanical movements employed are in most cases so inherently heavy that their weight alone renders them undesirable and impractical.

The electrical types share a good many of the disadvantages of the mechanical types. The usual devices of the electrical type, consist of an electric motor carried by the hub, the armature of which is directly connected through gearing to the blades which are to have their pitch adjusted. Inasmuch as a high torque is required to overcome the resistance of the blades to turning, a relatively large train of these gears will be required, resulting in undesirable weight and a correspondingly low speed of adjustment.

Controllable pitch propellers of the hydraulic type, have heretofore necessitated, in all known cases, pipe lines and other fluid connections extending between the rotating propeller and the stationary portions of the ship. In some instances, hollow drive shafts have been used for conveying the oil or other fluid, but in every case hydraulic packing is required to seal the various rotatable joints and the danger of leakage is always present. Propellers of this type have previously employed special pumps operated by the airplane power plant to produce the necessary fluid pressure for obtaining adjustment of the blades. Refinements of this type of system, for example those for effecting an automatic control of the pitch of the blades, have required further modification and alteration of the equipment on existing ships. Accordingly, it has been found to be impractical to attempt to equip existing planes with pitch control mechanisms of this type as the expense involved is almost prohibitive.

By the present invention, it is contemplated to combine the advantages of known systems of the mechanical, electrical and hydraulic types without introducing their inherent disadvantages. According to this invention, hydraulic pressure is employed for effecting the desired variations in the pitch of the blades, and the pump or pumps for supplying this hydraulic pressure are built directly into the propeller hub, thus requiring no outside source of pressure and accordingly no fluid conduits between relatively moving parts and no appreciable modification of the ship itself. The nature of the present construction lends itself very readily to automatic control and/or manual control from the cockpit of the plane. The most convenient manner for effecting this control is by electrical devices utilizing as source of current, the battery ordinarily carried by the plane. It is also possible according to the construction of the present apparatus to vary the pitch of the propeller blades whether or not the airplane engine is operating. Thus, even though a given engine may not be running, whether in the air or on the ground, its blades may be adjusted to any position to permit starting of the engine, feathering, or any other effect desired.

Whereas it is highly important that independent control of the several propellers always be possible, the principles of the present invention render it feasible to so synchronize the propeller blades of a multi-motor airplane when desired, that all of the blades of all its propellers will assume the same pitch setting at any particular time.

Briefly stated, the present invention comprises a hub containing a plurality of propeller blades which are adjusted through suitable gearing by an hydraulically operated piston. The piston is in turn adjusted by actuation of suitable valves which regulate the passage of fluid between the opposite ends of the piston and a pump or pumps carried by the hub. The valves are set to their desired positions by electromagnetic means which may be energized automatically by centrifugal means carried by the hub, or manually by selecting the position of one or more switches mounted in the cockpit of the plane. The pump or pumps may be driven through suitable gearing by electromagnetic means also carried by the hub, which is likewise energized automatically or manually as desired. The electromagnetic means for adjusting the valves and driving the pump is operable regardless of whether the power plant is running, rendering it possible to adjust the blades to their starting pitch or to their feathering pitch, or to any intermediate pitch at any time.

A more complete understanding of the present invention will be had by a more complete description referring to the figures of the drawings.

In the drawings:

Fig. 1 is a plan view, partly in section of the propeller hub;

Fig. 2 is an elevation partly in section of the mechanism contemplated by the present invention and taken along line 2—2 of Fig. 4;

Fig. 3 is an elevation partly in section at right angles to the elevation of Fig. 2;

Fig. 4 is a plan taken along lines 4—4 of Fig. 2; and

Fig. 5 is a circuit diagram showing the electrical connections.

A three blade propeller hub is depicted in the drawings as comprising a body 20 provided with three blade sockets 22 for reception of the root ends 24 of the blades 26. Whereas the present invention is equally applicable to propellers equipped with hollow or solid blades, the former type has been shown in the drawings. As particularly shown in Fig. 1, the body of the hub is recessed at the base of each socket to provide a seat 28 for reception of a bearing 30. A suitable bushing 32 for cooperation with these bearings is fitted into the end of each of the hollow blades. In addition to the usual bearings 34 surrounding the root end of the blade and carried by the socket, the present construction contemplates the provision of an annular gear 36 securely locked on the root ends of each of the blades. These propeller blades together with their bearings and gears are held in position in their respective sockets by means of the threaded rings 38 provided with suitable hydraulic packing 40. Cooperating with each of the annular gears 36, and shown as substantially parallel with the engine shaft 42, there are a suitable number of rack bars 44 the movements of which operate upon the gears to effect the desired movement of the blades to change their pitch.

As shown in Fig. 2, the hub body 20 is assembled upon the nose 46 of an airplane, by means of a nose plate 48 which is bolted thereto, merely replacing the usual nose plate with which the particular ship is ordinarily equipped. The hub is splined at 45 to the engine shaft in the usual manner and is provided with the customary bearing nut 50, collar 52, cone 54, split cone 56, bearing nut 58, and positioning ring 59.

The end of the hub nearest the engine, which is the end shown in the lower part of Fig. 2, is provided with a counterbore 60 for reception of a portion of the control mechanism. Loosely mounted on the inner wall 62 defined by the counterbore, and supported upon one or more suitable bearings 64, there is provided an annular element 66 having a substantially cylindrical portion 68 provided on its periphery with a worm thread 70. This annular element is also provided with a flanged or circumferential portion 72, constituting in effect the rotor of an electrical machine. This circumferential portion may assume the form of a spider presenting a plurality of spaced poles. The outer wall 76 of the hub defined by the counterbore 60, suitably supports as by bolts or the like, an annular or radially projecting element 78 carrying a suitable winding or windings 80 to constitute what is in effect the stator of an electrical machine.

The worm 70 in assembled relations engages the teeth of one or more worm wheels or pinions 82 which are secured to their separate shafts 84. These shafts carrying the pinions, are supported for rotation in suitable blocks 86 which are fastened by bolts 87 or otherwise secured in the counterbore 60 of the hub. These blocks are suitably bored to provide recesses 88 for the reception of shaft bearings 90 and 92 which serve to support the opposite ends of the shafts. The bearings 92 are assembled on the shaft by a nut 94 and the shaft and pinion assembly is held in the blocks by means of a nut 96 threaded into the block 86 so as to engage a race of the bearing 92. One end of each shaft is extended beyond the bearing 90 and has secured thereto by a pin 98 or the like, an eccentric 100 which is received by a slotted yoke 102 integral with or secured to a piston 104. These pistons serve as pumping elements and operate in cylinders 106 formed by drilling directly into the body of the hub at its suitably located protruded portions 108. After these cylinders have been properly formed, they are closed to atmosphere at one end by the insertion of threaded or otherwise attached plugs 110.

The operation of the pump may be summarized as follows: Under ordinary conditions when the windings 74 and 80 of the motor are not energized, the friction between the worm 70 and the pinions 82 will cause the annular rings 66 to rotate with the hub of the propeller. The stator portion of the machine, 78 being rigidly affixed to the hub will likewise rotate, and at the same speed as the rotor. When the windings are energized however, either automatically or selectively, to be described hereinafter, a torque will be set up between the stator and rotor and there will be a differential movement causing rotation of the armature rotor. Naturally, this will drive the worm 70 causing it to rotate the pinions 82 and their shafts 84, carrying with them the eccentrics 100 which operate in their respective yokes to drive the pump pistons 104.

After the hub body together with the control mechanism contained in its counterbore is mounted on the nose plate, the joint between the hub body and the nose plate is provided with an annular thimble 105 which is threaded on to the nose plate and carries a suitable packing 107 to prevent the admission of dirt to the mechanism.

At these same enlarged or protruded portions 108 of the hub, a plurality of substantially radial bores are likewise formed to define fluid passages 112 and 114 which serve as intake and delivery conduits respectively for fluid subjected to pressure by the piston 104, which thus constitutes a fluid pump. After the drilling operation has been completed, the pump intake and delivery passages are also provided with plugs 116 to close them to atmosphere.

The upper end of the hub body as viewed in Fig. 2 is provided with a pair of annular counterbores 120 and 122 defining pump delivery and intake reservoirs respectively. These reservoirs communicate with the radial delivery and intake passages already referred to, through longitudinally disposed passages 124, and 126 serving the delivery and intake sides of the pump respectively. These passages 124 and 126 are enlarged or counterbored near their upper ends for the reception of spring pressed valves or check valves of other types for assuring the proper direction of the flow of liquid under the influence of the pump. The delivery valve 128 and the intake valve 130 are suitably seated to permit the passage of fluid in one direction only. Having formed the delivery and intake reservoirs, the counterbores are closed to atmosphere by annular rings 132 and 134 respectively, which rings are preferably provided with tapered edges and tapered threads to assure their fluid tight relationship with the hub body.

A casing 133 containing a number of the control elements is superimposed upon the propeller hub body and fastened thereto by means of bolts 135 projecting from a plurality of lugs 136 extending from the blade sockets 22. The casing is provided with a base plate 138 which rests directly upon the upper portion of the hub body, and has extending upwardly therefrom (as viewed in Figs. 2 and 3) a substantially cylindrical sleeve 140. Partially surrounding the sleeve 140, there is an outer cylindrical sleeve 142 which is joined in fluid tight relationship to the base plate 138 by screw threads 144 or the like. In order to assure a fluid tight joint between the sleeve 140 and its surrounding sleeve 142, a threaded thimble 143 is screwed on to the sleeve 140 and bears with a tapered surface 145 against a similar or dissimilar taper formed on the upper end of the sleeve 142. Between the opposed concentric walls of the sleeves 140 and 142, there is positioned an annular piston 146, the movements of which are subject to control by the application of fluid pressure to its surfaces. The opposite surfaces of this piston are provided with suitable annular hydraulic packings 148 to prevent fluid leakage as far as possible. These packings may be positioned by appropriate retainers 149. Projecting upwardly from the propeller hubs and directly fastened to the piston, are the ends of the rack bars 44 each formed with a reduced end 150 to define a shoulder 152 between which and the nut 154, the piston is tightly clamped. Thus it will be seen, that when the piston is operated to move upwardly or downwardly, the rack bars will follow, such movements being in turn transmitted to the annular gears 36 to impart a corresponding movement to the propeller blades and thus adjust their pitch.

The supply of fluid to the surfaces of this piston is controlled by a pair of piston valves 156 and 158 which are operated together by a yoke 160, which is in turn fastened, shown as riveted, upon a sleeve 162 which is slidably mounted upon a rod 164. The rod 164 extends downwardly through the yoke and at its reduced lower end threadedly carries a perforated piston 168 which is bathed in fluid 170 so as to constitute a dash pot to damp the actuation of the centrifugal control mechanism to be described. Suitable provision may be made for varying the apertures in the piston 168 so as to change the degree of retardation. Cylinders for these valve and dash pot pistons are defined by a web 172 extending across the base of the casing 133. In the central portion of this web, the dash pot cylinder 174 is defined, beyond which and diametrically disposed, are the valve cylinders 176 and 178 for reception of the valves 156 and 158 respectively. A packing nut 180 surrounds the rod 164 to close the upper end of the cylinder 174 into which it is threaded. This nut is provided with a suitable hydraulic packing 182 which may be held in position by a retainer 184.

As more clearly shown in Fig. 2 of the drawings, each of the piston valves is provided with three ports. The valve 156 and its cylinder 176 are provided with an upper port 186 in communication with the pump intake reservoir through a pipe connection 187; a central port 188 having a pipe connection 190 to a port 192 opening to the lower surface of the piston 146; and a lower port 194 having a pipe connection 196 to the delivery reservoir of the pump. The valve 158 and its cylinder 178 are provided with corresponding ports, comprising an upper port 198 communicating through a connection 200 with the pump delivery reservoir; a central port 202 communicating through a pipe 204 and a conduit 206 formed in the wall of the member 140, with a port 208 serving the upper surface of the piston 146; and a lower port 210 connected through a pipe 212 with the intake reservoir of the pump.

Since the hydraulic operation in the present case, preferably depends upon a full system, a well 214 is provided to depend from the base plate 138 and extend down into the hollow engine shaft. This well is closed by a plate 216 threaded thereinto flush with the upper surface of the base plate. This well communicates through a passage 218 formed in one of the walls of the web 172 with some point of the hydraulic system, indicated for convenience as being the intake side of the pump. A piston 220 mounted in the well is provided with a hydraulic packing 222 and its retainer 224, and is subjected to the force of a relatively strong spring 226 which seats upon the lower end of the well. This assembly thus tends to maintain the entire hydraulic system at a uniform pressure so that it will be maintained full at all times. In the event that the quantity of fluid should become depleted through leakage or any other cause, one of the many plugs in the system, such as the plugs 110 and 116, can be removed and additional fluid under pressure admitted to refill the system and the well 214. It is also contemplated to apply pressure fittings to the system through which additional fluid may be admitted by a so-called quick connector coupling.

As shown in Figs. 2 and 3, the annular piston 146 is in its lowered position. When it is desired to raise the piston to change the pitch of the propeller blades, the valves 156 and 158 together with their yoke 160 will be lowered, admitting fluid from the delivery side of the pump through the port 194 of valve 156 into the chamber formed by the reduced portion of the valve and through the port 188 and pipe connection 190 to the port 192 thus tending to force the piston to its raised position. At the same time, fluid is withdrawn from the upper surface of the piston through the port 208 and pipe connection 204 to the central port 202 of the valve 158 into the chamber formed by the reduced portion of the valve and out through the lower port 210 and pipe connection 212 to the intake pump reservoir. When the annular piston is in its upper position and it is desired to lower it, the piston valves 156 and 158 together with their yoke 160 will be raised and the operation just described will be reversed to apply the delivery from the pump or pumps to the upper surface of the piston and withdraw the fluid from the lower surface.

In order to effect the raising and lowering of the valve to accomplish the results just described, a pair of solenoids 228 and 230, carried by a frame 232, control an armature or plunger 234 carried by the sleeve 162 and positioned thereon so as to move simultaneously therewith. The solenoid frame 232 is provided with a pair of legs 238 which rest upon the web 172 and the frame is suitably secured in this position, as by a ring 239 suitably received in a grooved portion of the sleeve 140. In order to assure the assumption of a neutral position by the valves 156 and 158 and the plunger 234 carried by the rod 164, upper and lower balancing springs 241 and 243 respectively, are provided. The upper spring 241 has its lower end seated on the upper surface of the plunger 234 and its upper end bearing upon a plate 245 assembled by screws 247 to the solenoid frame 232. The lower spring 243 has its upper end seated against the yoke 160 and its lower end upon the web 172 in a suitable seat 249 provided therefor.

It will be seen from the drawings, that when the upper solenoid 228 is energized, the plunger 234 will be lifted electromagnetically to raise the yoke 160 with the valves 156 and 158 causing the pumps to force the annular piston 146 to its lower position. Similarly when the solenoid 230 is energized, the armature or plunger 234 will be drawn downwardly, carrying with it the sleeve 162, yoke 160 and valves 156 and 158, resulting in the pumps forcing the annular piston 146 to its upper position. It will be noted that the solenoids are provided with a common lead 240, while the upper solenoid terminates in the lead 242 and the lower solenoid terminates in a lead 224. These leads may be combined into a suitable multi-conductor cable which is carried down through the casing 133 into the hub body 20 where they are suitably connected with the circuits of the windings 74 and 80 of the motor and to brushes 246, 248 and 250. These brushes bear upon collector rings 252, 254 and 256 carried by the nose plate 48 whence they are carried through conductors 258, 260 and 262 respectively and through a suitable cable to the cockpit of the plane. The circuits will be traced more explicitly in conjunction with the explanation of Fig. 5 of the drawings.

Mounted in the upper portion of the cylindrical sleeve 140, a pair or normally open switches 266 and 268 are provided designed to be closed under the pressure of an arm 270 carried by a fly ball governor mechanism 272. The governor assembly is mounted on the reduced upper end of the rod 164, as by a nut 273, and bears against the shoulder 236. The governor comprises a lower block 274 to which are pivoted a pair of lower arms 276 and 278 whose upper ends are pivoted to the weights 280 and 282 respectively. An upper pair of arms 284 and 286, which may be provided with a spring 287 of the customary type, are also pivoted to the weights 280 and 282 respectively, and these upper arms are in turn pivoted about a common axis by a pin or the like 288 passing through an opening formed in a plate 290 which may be seated on a suitable shoulder 292 formed near the upper end of the sleeve 140. The upper end of the sleeve may be closed by a cap 294 threaded or otherwise attached thereto.

Referring now to Fig. 5, a switch arm 304 provided in the cockpit of the plane, is provided with a plurality of contacts 306, 308 and 310. The switch arm is also connected through the battery 312 customarily carried by the plane and thence to ground 314. The motor 74—80, which has been shown for convenience as a shunt motor, but which may assume any other desirable form, likewise has one of its terminals connected to ground 314. When it is desired to shift the pitch of the blades in one direction, the switch arm 304 is moved to its contact point 306 whereupon the circuit is as follows: From ground 314 through battery 312 through switch arm 304 to switch contact 306, by way of conductor 244 to energize solenoids 230 causing a lowering of the plunger 234, then through lead 240 and through the motor to ground 314. It will thus be seen, that when the solenoid 230 is energized to move the plunger 234, the motor will be simultaneously energized to assure operation of the pump.

If it is desired to adjust the pitch of the blade in the other direction, the contact arm 304 will be moved to contact 310 whereupon the circuit may be traced as follows: From ground 314 through battery 312 through switch arm 304 and its contact 310, then through conductor 242 to energize the upper solenoid 228, whereby the plunger will be pulled to its raised condition, then through conductor 240 to the motor and again to the ground. Here again when the upper solenoid is energized, the motor is likewise energized and the valve adjustment will occur simultaneously with the operation of the pump.

The central contact 308 for the switch arm 304, is connected through a lead 316 common to the switches 266 and 268, which are actuated by the arm 270 of the fly ball governor mechanism. The opposite side of switch 266 is connected through a conductor 318 with the lower solenoid 230 through the conductor 244. The other pole of the switch 268 is connected by a lead 320 with the conductor 242 and consequently the upper solenoid 228. Hence it will be seen, that when the switch arm 304 is moved to the central or automatic position so as to make contact with the point 308, operation of the fly ball governor will automatically shift the pitch of the blades in accordance with the instantaneous speed at which the propeller is driven. Assuming the switch arm 304 to be in contact with the point 308, and the fly ball governor raised so as to close the switch 266, the circuit will be as follows:

From ground 314 through battery 312 and switch arm 304, through contact 308, lead 316, through the switch 266 to lead 318, through conductor 244 to energize the solenoid 230, then through the lead 240 and the motor to ground at 314.

Should the engine speed become sufficiently reduced for the contact arm 270 to close the switch 268, still assuming the switch arm 304 to rest upon contact 308, the circuit will be as follows: From ground 314 through battery 312, switch arm 304, contact 308, lead 316, switch 268 and lead 320 to energize solenoid 228 then through conductor 240 and the motor again to ground 314.

In order that there will be no fluttering and to avoid constant shifting when the pitch is being controlled automatically, the dash pot which has already been described is provided.

I claim:

1. A controllable pitch propeller comprising a hub supporting a plurality of blades, a piston articulated to said blades to vary their pitch, a cylinder receiving said piston, a pump carried by said hub to supply fluid pressure to said piston, a fluid connection between said pump and said piston, and means completely carried by said hub for driving said pump, said means receiving its basic source of energy from a point inboard of said propeller and independently of the rotation of said propeller, said means and said piston being disposed on opposite sides of a plane passing through the axes of said blades.

2. A controllable pitch propeller comprising a hub supporting a plurality of blades, a piston articulated to said blades to vary their pitch, a cylinder receiving said piston, a pump carried by said hub to supply fluid pressure to said piston, a fluid connection between said pump and said piston, electromagnetic means completely carried by said hub for driving said pump, said electromagnetic means and said piston being disposed on opposite sides of a plane passing through the axes of said blades.

3. A controllable pitch propeller comprising a hub supporting a plurality of blades, a piston articulated to said blades to vary their pitch, a pump having inlet and outlet ports carried by said hub to supply fluid pressure to said piston, shiftable valve means between each of said ports and said piston for controlling the direction of application of said fluid pressure to said piston, and electromagnetic means carried by said hub for positively shifting said valve means.

4. A controllable pitch propeller comprising a hub supporting a plurality of blades, a piston articulated to said blades to vary their pitch, a cylinder receiving said piston, a pump carried by said hub to supply fluid pressure to said piston, said pump having inlet and outlet ports, a fluid connection between said pump and said piston, valve means for controlling said ports and directing said fluid pressure, and interconnected means for shifting said valve means and for driving said pump.

5. A controllable pitch propeller comprising a hub supporting a plurality of blades, a piston articulated to said blades to vary their pitch, a pump carried by said hub to supply fluid pressure to said piston, said pump having inlet and outlet ports, valve means for controlling said ports and directing said fluid pressure, and interconnected electromagnetic means for shifting said valve means and for driving said pump.

6. A controllable pitch propeller comprising a hub supporting a plurality of blades, a piston articulated to said blades to vary their pitch, a pump carried by said hub to supply fluid pressure to said piston, shiftable valve means for selectively directing said fluid pressure to opposite sides of said piston, and centrifugal governing means carried by said hub for shifting said valve means and for controlling operation of said pump.

7. A controllable pitch propeller comprising a hub supporting a plurality of blades, means subjected to fluid pressure connected to said blades to vary their pitch and electrically driven means and an electric driving means therefor carried by said hub and completely rotatable therewith for producing said fluid pressure, said means being disposed on opposite sides of a plane passing through the blade axes.

8. A controllable pitch propeller comprising a hub supporting a plurality of blades, a piston connected with said blades for varying their pitch, a closed system in said hub containing a body of liquid contacting opposed surfaces of said piston, means carried by said hub for positively shifting liquid from one surface of the piston to the other, means for reversing the flow of liquid between the piston surfaces, and means in said system maintaining the liquid under continuous pressure.

9. A controllable pitch propeller comprising a hub supporting a plurality of blades, a piston connected with said blades for varying their pitch, a body of liquid in said hub contacting opposed surfaces of said piston, a plurality of pumps carried by said hub for shifting liquid from one surface of the piston to the other and a prime mover completely carried by said hub for driving said pumps, said prime mover and said piston being disposed on opposite sides of a plane passing through the blade axes.

10. A controllable pitch propeller comprising a hub supporting a plurality of blades, a closed hydraulic system and a prime mover therefor completely carried by said hub, means driven by said prime mover for applying pressure to said system to vary the pitch of said blades and positively actuated reversible valve means interposed in said system for reversing the effect of said pressure upon said blades, said prime mover receiving energy from a source carried inboard of said propeller and independently of the rotation of said propeller.

11. A controllable pitch propeller comprising a hub supporting a plurality of blades, a closed hydraulic system and driving means therefor completely carried by said hub, and means carried by said hub disposed on opposite sides of a plane passing through the blade axes cooperating with said driving means for applying pressure to said system when said propeller is idle for varying the pitch of said blades, said driving means receiving its basic source of energy from a point inboard of said propeller.

12. A controllable pitch propeller comprising a hub supporting a plurality of blades, a closed hydraulic system and driving means therefor completely carried by said hub, and means carried by said hub disposed on opposite sides of a plane passing through the blade axes cooperating with said driving means for applying pressure to said system when said propeller is rotating for varying the pitch of said blades, said driving means receiving its basic source of energy from a point inboard of said propeller and independently of the rotation of the propeller.

THOMAS A. DICKS.